United States Patent
Jung

[11] Patent Number: 6,147,777
[45] Date of Patent: Nov. 14, 2000

[54] COMBINED PRINTING AND SCANNING HEAD

[75] Inventor: Jong-Sung Jung, Seoul, Rep. of Korea

[73] Assignee: SamSung Electronics Co., Ltd., Suwon, Rep. of Korea

[21] Appl. No.: 08/967,325

[22] Filed: Oct. 21, 1997

[30] Foreign Application Priority Data

Oct. 21, 1996 [KR] Rep. of Korea .................. 96-47262

[51] Int. Cl.$^7$ .................................................. H04N 1/024
[52] U.S. Cl. ............................................ 358/473; 347/102
[58] Field of Search .................................. 358/473, 474, 358/472, 494, 497, 496, 475; 400/705, 279, 705.1; 347/102

[56] References Cited

U.S. PATENT DOCUMENTS

| | | |
|---|---|---|
| 2,776,336 | 1/1957 | Clauer . |
| 3,676,586 | 7/1972 | Uno ......................................... 178/7.2 |
| 3,899,035 | 8/1975 | Rothgordt ............................. 178/6.6 A |
| 4,303,936 | 12/1981 | Shaw ........................................ 358/77 |
| 4,424,523 | 1/1984 | Snelling et al. ........................ 346/160 |
| 4,635,130 | 1/1987 | Oi ........................................... 358/296 |
| 4,683,501 | 7/1987 | Carena et al. .......................... 358/293 |
| 4,774,523 | 9/1988 | Beaufort et al. ........................ 347/102 |
| 4,823,195 | 4/1989 | Ito ........................................... 358/285 |
| 5,040,074 | 8/1991 | Stemmle ................................. 358/296 |
| 5,047,870 | 9/1991 | Filo ......................................... 358/472 |
| 5,442,449 | 8/1995 | Stemmle et al. ........................ 358/496 |
| 5,453,850 | 9/1995 | Akuzawa et al. ....................... 358/475 |
| 5,508,811 | 4/1996 | Abe et al. ............................... 358/497 |
| 5,731,829 | 3/1998 | Saito et al. ............................. 400/605 |
| 5,757,407 | 5/1998 | Rezanka ................................. 347/102 |
| 5,760,926 | 6/1998 | Howard et al. ......................... 358/472 |
| 5,812,172 | 9/1998 | Yamada .................................. 358/472 |
| 5,864,352 | 1/1999 | Aoki et al. .............................. 347/102 |
| 5,880,852 | 3/1999 | Asano et al. ............................ 358/472 |
| 5,892,523 | 4/1999 | Tanaka et al. .......................... 358/472 |
| 5,896,154 | 4/1999 | Mitani et al. ........................... 347/102 |
| 5,896,206 | 4/1999 | Kellogg .................................. 358/498 |

*Primary Examiner*—Jerome Grant, II
*Attorney, Agent, or Firm*—Robert E. Bushnell, Esq.

[57] ABSTRACT

A combined machine for printing and scanning is capable of obtaining a consistent output value from an image pickup device by providing a light source, mounted to a frame, that irradiates a whole line to be scanned or printed. The light source is provided at the rear end of the head assembly which traverses the printing medium or scanning document. The device dries ejected ink in a short time by heat radiated from the light source when performing a printing operation.

31 Claims, 6 Drawing Sheets

COMBINED PRINTING AND SCANNING HEAD

CLAIM OF PRIORITY

This application makes reference to, incorporates the same herein, and claims all benefits accruing under 35 U.S.C. §119 from an application for *A COMBINED MACHINE FOR PRINTING AND SCANNING* earlier filed in the Korean Industrial Property Office on the $21^{st}$ of October 1996 and there duly assigned Serial No. 47262/1996.

BACKGROUND OF THE INVENTION

1. Field of the Invention

The present invention relates to a combined machine for printing and scanning having a head assembly including a printer module and a scanner module, and more particularly to an improved combined machine for printing and scanning which is capable of obtaining consistent output values with an image pickup device by using an elongated light source mounted on the printer at the rear end of the head module over which the head traverses while traversing a document, the light source for scanning being separate from the scanner module and irradiating equal quantities of light over the whole area for scanning. The invention is capable of drying ejected ink in a short time by heat radiated from the light source.

2. Description of the Related Art

Nowadays, office automation facilities or equipment, such as a printer and a scanner, are widely used. These facilities, having high efficiency, are developed with enhanced features and, thus, cause the price of these products to become high. The present invention has been produced to lessen the economic burden of a user by developing a combined machine for printing and scanning.

Examples of contemporary printers in the art may be grouped in three areas. The first area includes those combined printer-scanner head assemblies with a self-contained light source. For example, U.S. Pat. No. 5,047,870 to Filo, entitled *Image Reproduction System Utilizing Single Operation Scanning/Reproducing*, describes a traversing head assembly which contains a light emitting diode and photo transistor connected by a cable to a processing circuit. The head assembly also includes a thermal print head. Both the scanner and print head address the same document fed thereunder. The second area includes those devices which include a fill-length head and/or light source. U.S. Pat. No. 3,676,586 to Uno, entitled *Thin-Window Image Pick-Up And Recording Tube*, describes a thin-window image pick-up and recording tube including a full-length flourescent layer. An electron beam is emitted from an electron gun which causes the flourescent layer to luminesce and irradiate an object or sensitized sheet. When the device is used for scanning, the strength of the electron beams emitted through the document varies according to the existence or shading of images on the document. The flourescent plate luminesces in a corresponding pattern. U.S. Pat. No. 3,899,035 to Rothgordt, entitled *Facsimile Transmitting Receiving System With Fibers Having A Conductive Coating*, provides an array of a lined fibers that emit light and sense the intensity of light reflected from a document. U.S. Pat. No. 5,040,074 to Stemmle, entitled *Full-Width Simultaneous Read/Write Copier*, provides a full-width head including an LED array and lens for scanning, as well as a printing bar. Images are read from documents advanced by one platen, and images are formed on other documents advanced by another platen. A third group pertains to combined, or simultaneously driven, printing and scanning elements. U.S. Pat. No. 4,303,936 to Shaw, entitled *Structure For And Method Of Reproduction*, includes a single light source, or plurality of light sources, directing light through a original document to light sensors. Signals are amplified and directed to a printer which forms images on a document advanced separately from, but in synchronicity with, the document being scanned. U.S. Pat. No. 4,424,523 to Snelling et al., entitled *Read/Write Bar For Multi-Mode Reproduction Machine*, describes a full-width head containing an array of LED elements and optical fibers. The device scans images from a document fed across one platen, and imparts a latent image onto a photosensitive drum, a technique that is conventional in electrophotographic processes. U.S. Pat. No. 4,635,130 to Oi, entitled *Image Reading/Recording Apparatus*, describes a full-width head including a recording portion and a reading portion proximate to a roller. U.S. Pat. No. 2,776,336 to Clauer, entitled *Dual Function Facsimile Apparatus* includes a carriage which moves scanning and reproducing head relative to individual document and recording sheet feed rollers. The scanning unit traverses the width of the document advanced by a platen. Two elongated flourescent lamps are fixed to the frame and illuminate the entire width of the document being scanned. The print head is located on the opposite side of the carriage, and, with an ink-fed stylus, imprints indicia on recording papers advanced by a different platen than that which advances the document to be scanned.

I have found that the conventional combined printing and scanning machine has several problems. First, as it takes much time to dry ink ejected by a printer head unit of the ink-jet printer on the paper, it is difficult to perform printing at high speed. Occasionally, as the paper feed roller contacts on an area where ink is not dried completely, ink can spread or smear on the paper. Moreover, as the conventional combined printing and scanning machine typically has a small lamp inside of the scanner module, disassembly of the lamp is difficult, and often requires inconvenient after-sales service.

SUMMARY OF THE INVENTION

An object of the present invention is to provide an improved image forming process and head assembly equipped with printing and scanning elements.

It is another object of the present invention to enhance the printing speed during image formation by drying ink ejected on a printing medium in a short time.

It is yet another object of the present invention to ensure scanning of high resolution by unifying output, and assuring consistent output, of an image pickup device by unifying the output of, or even by distributing light from, the light source over the whole area for scanning.

It is still another object of the present invention to provide for convenient after-sales service by making the disassembly of a lamp easy, being separate from the scanner module.

To achieve these and other objects, a process and a combined machine for printing and scanning is provided. The combined machine includes: a printing unit printing images onto a printing medium; a scanning unit for scanning data from a document; a driving unit reciprocally moving the printing unit and the scanning unit in a predetermined section; a guiding unit guiding the printing unit and the scanning unit during the reciprocal movement in the predetermined section; a feeding unit supplying the printing medium or document; and an irradiating unit for irradiating light onto the printing medium or document over the whole area where the reciprocation is performed. One embodiment uses a singular head assembly, including printing and scanning elements, that traverses a recording medium, such as paper, and a full-width light bar, across which the head assembly traverses, and that assures consistent illumination of the scanning area of the article being scanned. The irradiating unit is separately established from the printing unit and the scanning unit. The irradiating unit is provided at the rear end of an ink ejecting unit of the printing unit or head. A recess is formed in the printing unit and the scanning unit, facing the printing medium or document which accommodates the irradiating unit. Moreover, the irradiating unit is a long lamp having both ends fixed to the main frame of the device.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
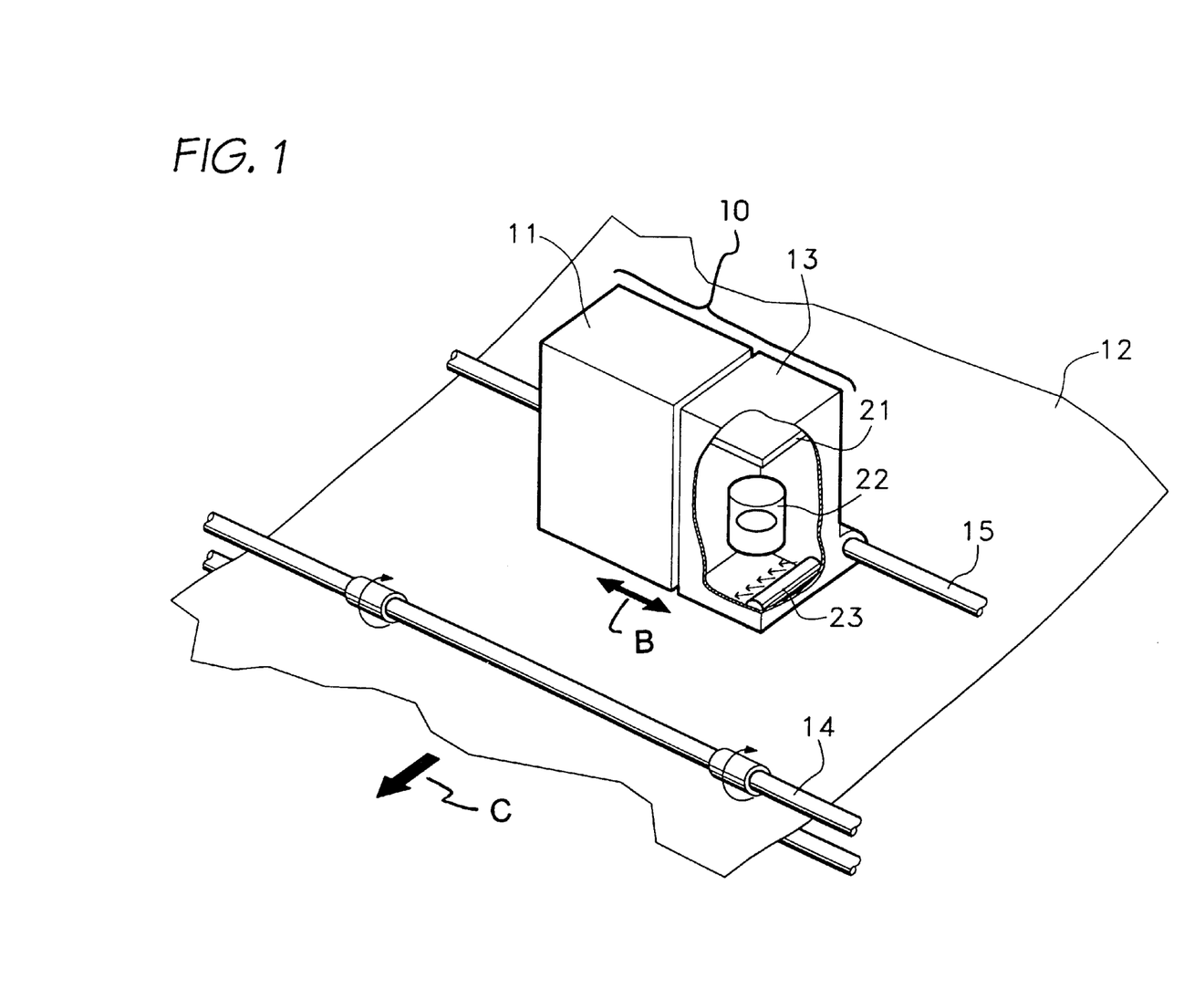
FIG. 1 is top right front perspective view of a combined machine having a head assembly including printer and scanner modules.
Figure 2:
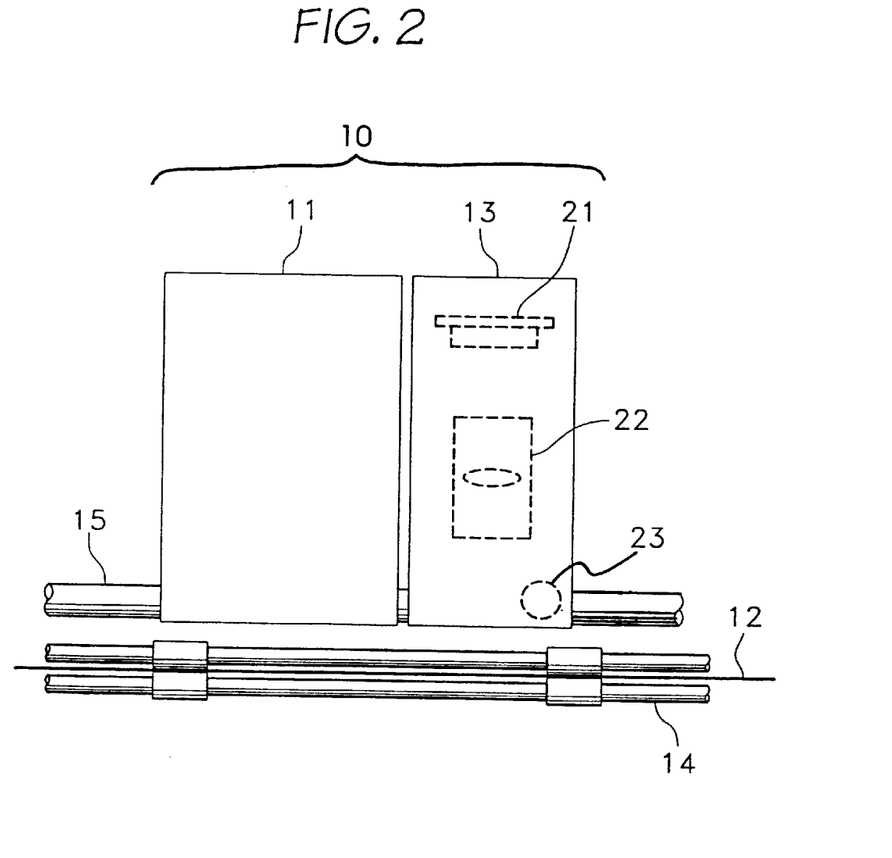
FIG. 2 is a front elevational view of the combined machine of FIG. 1.

FIG. 1 is a top right front perspective view of a combined machine having a head assembly including printer and scanner modules, and FIG. 2 is a front elevational view of the combined machine of FIG. 1. As illustrated, a head assembly 10 contains a printer module 11 which performs a printing operation by spraying ink on a printing medium 12. The head assembly 10 also contains a scanner module 13 which reads data from a document 12. The printing and scanning is performed through the reciprocation of the head assembly 10, powered by the rotation of a driving motor (not illustrated), along a guiding shaft 15. At this time, as a paper feeding roller 14 rotates, the printing medium or document is moved in the direction of arrow C under the head assembly 10 where each line of data is printed or scanned along a line. More specifically, the printing operation is performed by spraying ink from the head module 11 onto printing medium 12 through a head unit (not illustrated) as the head assembly 10 is moved in the right and left directions indicated by arrow B across the medium 12.

Referring also to FIG. 2, when the head assembly 10 is moved to right and left, a lamp 23 inside of scanner module 13 irradiates light onto the document. The reflected light from the surface of the document 12 is received by an image pickup device 21 through a scanner glass (not illustrated) and a lens 22.

Figure 3:
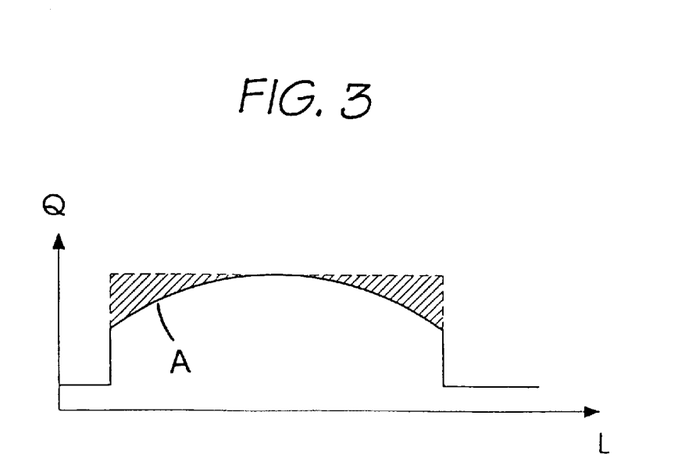
FIG. 3 is a graphical representation of the distribution of the quantity of light Q according to the length of a lamp L, the vertical axis corresponding to quantity and the horizontal axis corresponding to lamp length.

I have noticed that, as is shown by curve A in the two coordinate graph of FIG. 3, when "Q," indicates the quantity of light, versus "L," which indicates the length of the light source, when the scanner light source is mounted on the traversing head assembly 10, the quantity of light in the central part, local to the head, is greater than the quantity at both sides of the head. Thus, the output value of the image pickup device of the scanner module is unequal across the scanned area and it is impossible to perform scanning of high resolution.

Figure 4:
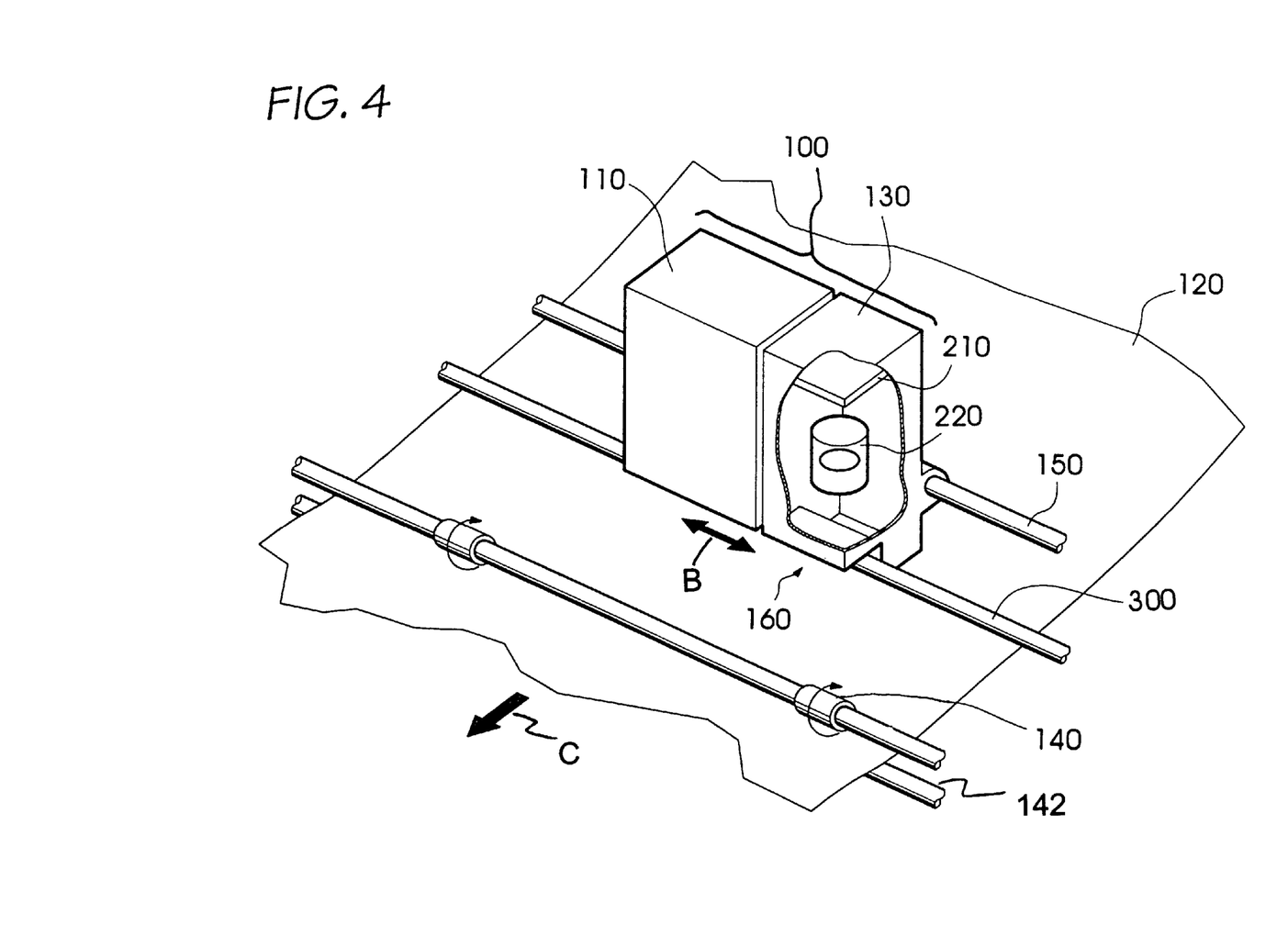
FIG. 4 is a top right front perspective view of a combined machine having a head assembly including printer and scanner modules, constructed according to the present invention.

Turning now to FIG. 4, a combined machine having a head assembly including printer and scanner modules includes: a head assembly 100 with a printer module 110 for performing the printing operation of forming images and symbols onto a printable medium by spraying ink on print medium 120; a scanner module 130 for reading data from a document; a guiding shaft 150 for guiding the head assembly 100 as printing and scanning are performed by reciprocation of the head corresponding to rotation of a driving motor (not illustrated); a long lamp 300 that is positioned across the printing medium 120 to irradiate the whole scanning area in order for the scanner module 130 to scan the data; and a plurality of paper feeding rollers 140 mounted on rotatable shafts 142 for supplying the printing medium or document on a line unit. A recess 160 is formed in a rear, trailing corner of the head assembly 100 containing the printing unit and the scanning unit, facing the printing medium 12 or document. Both ends of the long lamp 300 are fixed to the frame (not shown) inside the combined machine. Recess 160 accommodates the presence of the elongated lamp 300 while positioning the array of nozzles 200, shown in FIG. 5A, in its customary position closely spaced-apart from print medium 120; this configuration assures that lamp 300 is immediately above the most recently printed line of an image that is next advanced in the direction of arrow C immediately upon completion of the formation of images along line 122.

Figure 5A:
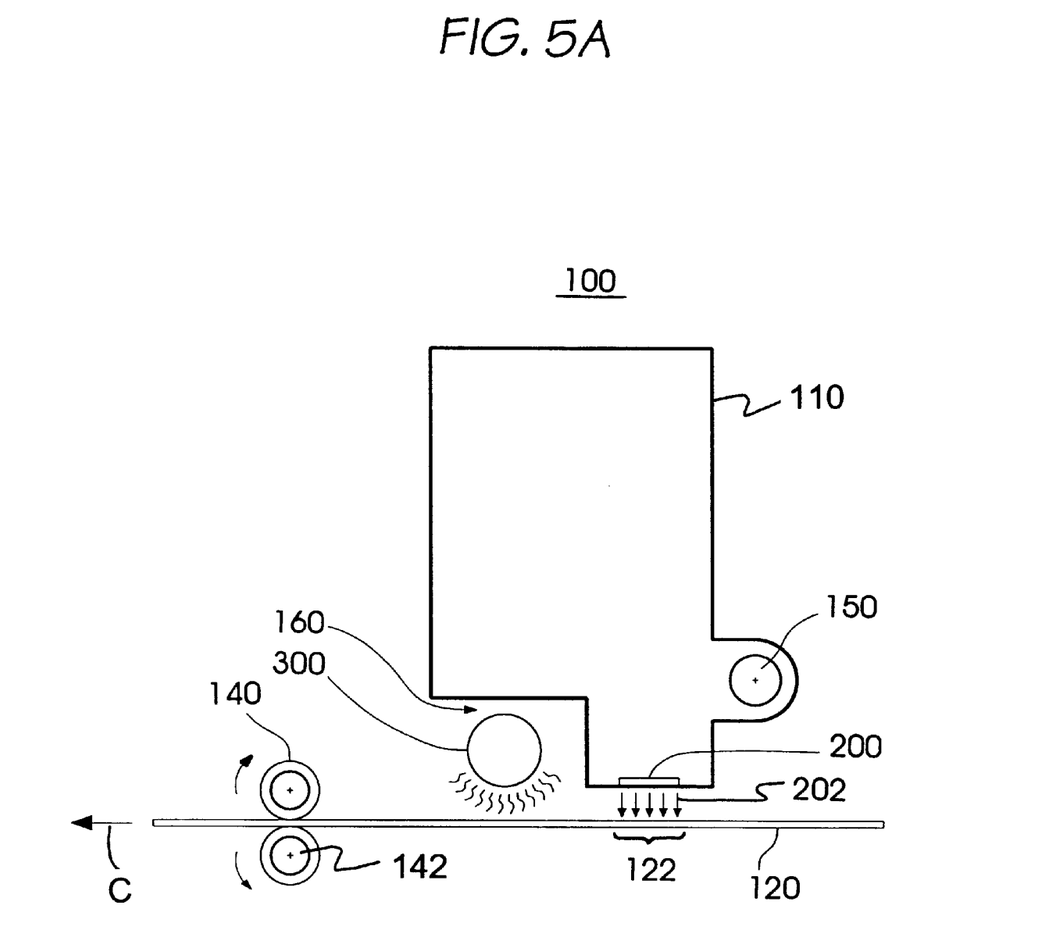
FIG. 5A is a right side elevational view of the head assembly of the present invention in a printing mode.

The operation of the head assembly containing the printer and scanner modules is illustrated with reference to FIGS. 5A and 5B. FIG. 5A is a right side elevational view of head assembly 100 of the present invention in printing mode. As shown, the printing operation is performed by spraying ink 202 onto the printing medium 120 from an array of nozzles 200 located at the bottom of the head assembly 100 near corner recess 160 formed therein. The head assembly 100 travels along the guide shaft 150 that maintains the head assembly proximate to the lamp 300 throughout translation of the head assembly 100. The ink 202 is deposited along a line 122 of the printing medium 120 to define predetermined images. After that, as the printing medium 120 is transported by the paper feeding roller 140 in the direction shown by arrow C and the next line of medium 120 is exposed to ink ejected from nozzles 200, the printed line 122 is moved toward the long lamp 300. At this time, ink ejected from nozzles 200 along line 122 of the printing medium becomes dry within a short time by the heat radiated from the long lamp 300. Accordingly, before the printed line 122 passes under the paper feeding roller 140, the ink forming images along line 122 becomes dry completely, thereby preventing spreading or smearing on the paper by the paper feeding roller 140.

Figure 5B:
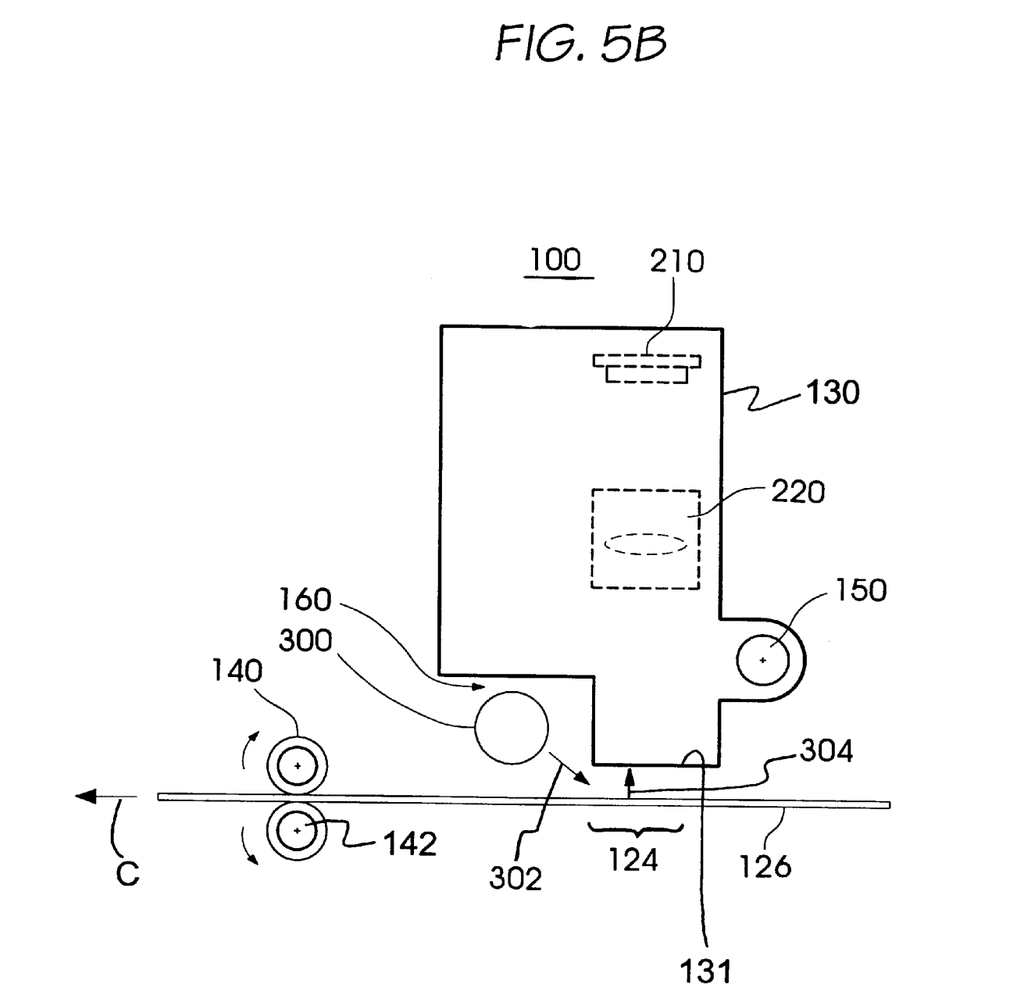
FIG. 5B is a right side elevational view, partially in cross section, of the head assembly of the present invention in a scanning mode.

FIG. 5B is a right side elevational view of the head assembly 100 constructed according to the principles of the present invention, while in a scanning mode. As shown, light 302 from the long lamp 300 is irradiated onto a line 124 of the document 126 having data for scanning. When the scanner module 130 of the head assembly 100 performs the reciprocation motion following the guiding shaft 150, the reflected light 304 from the document is received by an image pickup device 210 through a scanner glass 131 and a lens 220. Corner recess 160 not only accommodates the presence of elongate lamp 300, but also assures unobstructed location of the closest end of scanner 130 to the adjacent line 124 of document 126.

Figure 6:
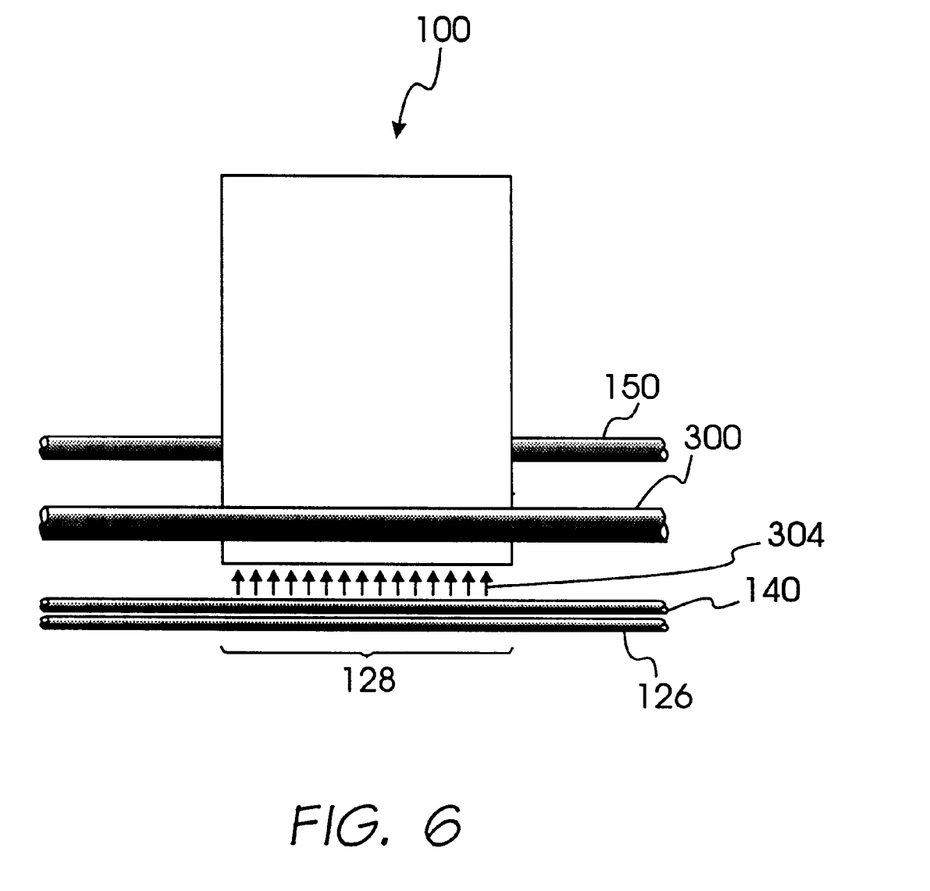
FIG. 6 is a front elevational view of the present combined machine having a head assembly, including printer and scanner modules, according to the present invention.

Referring also to FIG. 6, according to the present invention, because the long lamp 300 is located across the whole area, or line 124, over which the scanner module travels, an equal quantity of light is irradiated throughout the whole area, or line 124, and the output value of the image pickup device becomes equal or consistent across the scanned sector 128, thereby allowing scanning of high resolution. Unlike conventional scanner modules, where the light source is mounted on the traversing head, the present invention provides for illuminating the entire line of a document to be scanned. This assures that the sector 128 is illuminated evenly and consistently from edge to edge. A head-mounted light source does not adequately illuminate the outer edges of the sector 128, and thus does not afford the optical pick up unit the opportunity to receive a true image, portions thereof being unnaturally shaded or misrepresented.

As shown in FIG. 4, since the long lamp 300 is separate from the head assembly 100, exchanging the lamp 300 for another, when needed, is easy, and thus rapid after-sale service may be performed.

As described above, since the lamp used as a light source for the scanner module irradiates light over the whole area over which the head assembly 100 reciprocates, the image received and output is consistent and more accurately reflects the image on the document scanned, thereby permitting scanning of data having high resolution. In previous practice, when a small lamp is used inside the scanner module, the outside edge of the scanning sector tends to be less intense than the center, thus lessening the accuracy of scanned data. Moreover, ink ejected from the printer module is dried in a short time by the lamp provided at the rear end of the nozzle, and thus the spreading or smearing of ink is prevented and printing at a high speed can be performed. Additionally, in embodiments constructed according to the principles of the present invention, since a long lamp is provided outside the scanner module, instead of inside the module, lamp replacement is easy and after-sale service may be performed rapidly.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A combined machine for printing and scanning using a single feed path along which a printing medium on which printing is to be performed and a document to be scanned are fed, comprising:

a head;

printing means disposed in said head for printing on the printing medium;

scanning means disposed in said head for scanning data from the document;

driving means drivingly connected to said head for performing a reciprocation of said printing means and said scanning means in a predetermined direction substantially perpendicular to the single feed path;

guiding means slidingly contacting said head for guiding said printing means and said scanning means when performing the reciprocation;

feeding means for supplying the printing medium and the document proximate to said head; and irradiating means for irradiating light on said printing medium and said document over the whole area where the reciprocation is performed;

wherein said irradiating means is located near a rear end of said printing means for heating said printing medium after said printing medium passes through said printing means, whereby to dry ink on said printing medium.

2. The machine of claim 1, said irradiating means being separate from said printing means and said scanning means.

3. The machine of claim 1, further comprising a recess formed in said head, facing said printing medium and said document for accommodating said irradiating means.

4. The machine of claim 1, said irradiating means being a long lamp.

5. The machine of claim 4, said long lamp having two ends connected to a frame, between which ends said head is reciprocated.

6. The apparatus of claim 1, said head being interposed between said guiding means and said irradiating means.

7. The apparatus of claim 1, said printing means comprising a nozzle cooperating with the printing medium to define a first distance.

8. The apparatus of claim 7, said irradiating means and the printing medium defining a third distance greater than said first distance.

9. The apparatus of claim 1, said scanning means comprising a closest end cooperating with the printing medium to define a second distance.

10. The apparatus of claim 9, said irradiating means and the printing medium defining a third distance greater than said second distance.

11. An image-forming apparatus for printing and scanning using a single feed path along which a printing medium on which printing is to be performed and a document to be scanned are fed, comprising:

a guide;

a head traversing the guide along a line spanning a width of the printing medium and the document, said head carrying a printer module configured to form images along the line on the printing medium, and a scanner module configured to read images from the line on the document; and a lamp having a length approximately equal to said width of the printing medium for irradiating the line so as to dry ink on the printing medium when said printing medium leaves the printer module, and to create reflected light directed from the document toward the scanner module.

12. The apparatus of claim 11, said printer module and said scanner module being disposed along a second line generally parallel with the line.

13. The apparatus of claim 11, said lamp heating the line.

14. The apparatus of claim 11, said lamp irradiating successive lines of the printing medium after images are formed on each of said successive lines.

15. The apparatus of claim 11, said head having a recess formed therein for accommodating passage of said lamp therethrough.

16. The apparatus of claim 15, said recess being proximate to an ink discharger of said printing module.

17. The apparatus of claim 11, said printer module comprising a nozzle cooperating with the printing medium to define a first distance.

18. The apparatus of claim 17, said lamp and the printing medium defining a third distance greater than said first distance.

19. The apparatus of claim 11, said scanner module comprising a closest end cooperating with the printing medium to define a second distance.

20. The apparatus of claim 19, said lamp and the printing medium defining a third distance greater than said second distance.

21. An image forming apparatus for printing and scanning using a single feed path along which a printing medium on which printing is to be performed and a document to be scanned are fed, comprising:

a head traversing a line spanning a width of the printing medium and the document, said head carrying a printer module configured to form images along the line on the printing medium, and a scanner module configured to read images from the line on the document; and a lamp irradiating the line so as to dry ink on the printing medium when said printing medium leaves the printer module, and to create reflected light directed from the document toward the scanner module;

said apparatus further comprising a guide along which said head traverses, said head being interposed between said guide and said lamp.

22. An image-forming apparatus for printing and scanning using a single feed path along which a printing medium on which printing is to be performed and a document to be scanned are fed, comprising:

a frame;

a guide mounted on said frame;

a head slidingly mounted on said guide, said guide confining translation of said head along a line spanning a width of the printing medium;

a printer module mounted on said head and configured to form images along the line on the printing medium;

a scanner module mounted on said head and configured to read images along the line from the document; and a lamp having a length approximately equal to said width and mounted on said frame, said lamp irradiating the line;

said head having a recess accommodating passage of said lamp during the translation of said head along the line;

said apparatus further comprising a feed roller mounted on the frame and advancing the printing medium past said head in a direction perpendicular to the line.

23. The apparatus of claim 22, said printer module and said scanner module being disposed along a second line generally parallel with the line.

24. The apparatus of claim 22, said lamp heating the line.

25. The apparatus of claim 22, said lamp irradiating successive lines of the printing medium after images are formed on each of said successive lines.

26. The apparatus of claim 22, said recess being proximate to an ink discharger of said printing module.

27. The apparatus of claim 22, said head being interposed between said guide and said lamp.

28. The apparatus of claim 22, said printer module comprising a nozzle cooperating with the printing medium to define a first distance.

29. The apparatus of claim 28, said lamp and the printing medium defining a third distance greater than said first distance.

30. The apparatus of claim 22, said scanner module comprising a closest end cooperating with the printing medium to define a second distance.

31. The apparatus of claim 30, said lamp and the printing medium defining a third distance greater than said second distance.

* * * * *